Aug. 24, 1954
P. A. RAICHE
2,687,131
FEMALE INCONTINENCE CATHETER
Filed Sept. 17, 1952
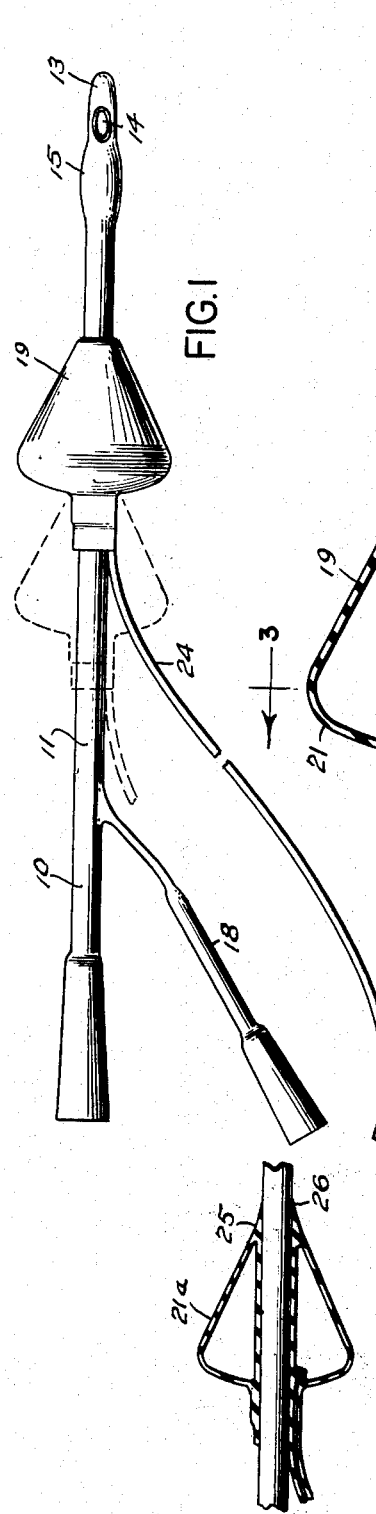
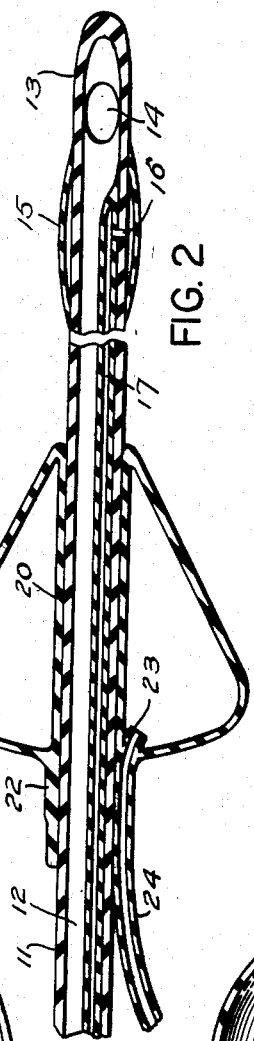
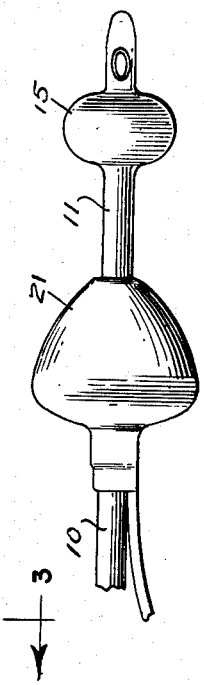
INVENTOR.
BY Paul A. Raiche
Nathaniel Frucht
ATTORNEY Patented Aug. 24, 1954

2,687,131

UNITED STATES PATENT OFFICE 2,687,131

FEMALE INCONTINENCE CATHETER

Paul A. Raiche, North Providence, R. I., assignor to Davol Rubber Company, a corporation of Rhode Island Application September 17, 1952, Serial No. 309,981

5 Claims. (Cl. 128—349)

The present invention relates to catheters and the like, and has particular reference to a novel construction for a female incontinence catheter.

The principal object of the invention is to provide a female incontinence catheter with a length adjustable external inflatable balloon.

Another object of the invention is to provide an inflatable balloon unit adapted to be readily mounted on a catheter at any desired portion thereof.

A further object of the invention is to provide an inflatable balloon unit for a catheter which releasably locks in place on the catheter when inflated.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a side view of an illustrative catheter of the female incontinence type, embodying the invention, and disclosing the distal end with an integral inflatable balloon and with an inflatable balloon unit adjustably mounted thereon in spaced relation to the integral inflatable balloon;

Fig. 2 is an enlarged sectional detail of the distal end of Fig. 1;

Fig. 3 is a section of Fig. 2 on the line 3—3 thereof;

Fig. 4 is a partial perspective view of the distal end as it appears when inflated for use; and Fig. 5 is a sectional view of a modified inflatable balloon unit.

It has been found desirable to provide a catheter or body cavity or tube, such as a female incontinence catheter, with an inflatable balloon unit which may be mounted on any desired portion of the catheter body, whereby the catheter may be adjusted to the patient to properly seat in place. I accomplish this desirable result by forming an inflatable balloon unit adapted to be slidably positioned on the catheter body, the unit having self-contained inflation means.

Referring to the drawings, the illustrated catheter designated by the reference numeral 10 is preferably formed of flexible rubber such as latex and includes an elongated generally cylindrical tubular body portion 11 having a longitudinal drainage channel 12 extending to the distal end 13, which has drainage eyes 14 in the body portion wall communicating with the drainage channel, an inflatable balloon 15 being positioned adjacent the eyes 13 as illustrated, and being in free communication through a wall opening 16 with an inflation conduit 17 which is preferably embodied in the body portion wall and has an external pressure fluid inlet 18.

A balloon unit 19 is slidably mounted on the body portion 11, and includes a central tubular portion 20, an expandible balloon 21 which is preferably of pear shape with its walls tapering forwardly as illustrated, and a rear tubular extension 22 through which the inner end 23 of an inflation tube 24 passes into the space between the central tubular portion and the expansible balloon. The balloon unit parts are integrally formed, and are preferably of flexible rubber, such as latex and are of suitable sizes for different catheter sizes, whereby the unit may be readily mounted on the catheter body portion, as by sliding the central flexible tubular portion 20 over the distal end of the body portion.

It has been found that a slight inflation of the balloon 21 facilitates sliding movement of the central tubular portion of the balloon unit on the catheter body portion; after a desired position has been reached, further inflation exerts pressure on and binds the tubular portion 20 to the catheter body portion, whereby clamping the end of the inflation tube 24 releasably locks the balloon unit in place. The catheter, when in use, expands as shown in Fig. 4, with the distal end balloon 15 inflated on the inside of a body cavity, and the balloon 21 inflated on the outside of the body cavity. In this position the balloon unit functions as a lock element and also as a urinal plug.

If desired, the balloon unit may have its forward end 25 tapered as indicated at 26 in Fig. 5, the balloon unit being designated 21a. This construction is desirable for catheters which require the balloon unit to extend or enter into a body cavity.

Although I have described a specific constructional embodiment of my invention, it is obvious that changes in the size, shape, and construction of the parts may be made to meet the requirements for different catheter constructions and uses, without departing from the spirit or the scope of the invention as defined in the appended claims.

I claim:

1. A female incontinence catheter, comprising a tubular body portion having a longitudinal drainage passage, the wall of the catheter at the distal end having a drainage eye communicating with the drainage passage, an inflatable balloon 2,687,131 integral with the body portion adjacent the distal end, and an inflatable balloon unit slidably mounted on the body portion in spaced relation to the integral inflatable balloon.

2. A female incontinence catheter, comprising a tubular body portion having a longitudinal drainage passage, the wall of the catheter at the distal end having a drainage eye communicating with the drainage passage, an inflatable balloon integral with the body portion adjacent the distal end, and an inflatable balloon unit slidably mounted on the body portion in spaced relation to the integral inflatable balloon, the body portion having an inflation passage in its wall communicating with the interior of the integral inflatable ballon.

3. A female incontinence catheter, comprising a tubular body portion having a longitudinal drainage passage, the wall of the catheter at the distal end having a drainage eye communicating with the drainage passage, an inflatable balloon integral with the body portion adjacent the distal end, and an inflatable balloon unit slidably mounted on the body portion in spaced relation to the integral inflatable balloon, said inflatable balloon unit having an inflation tube communicating with the interior thereof.

4. A female incontinence catheter, comprising a tubular body portion having a longitudinal drainage passage, the wall of the catheter at the distal end having a drainage eye communicating with the drainage passage, an inflatable balloon integral with the body portion adjacent the distal end, and an inflatable balloon unit slidably mounted on the body portion in spaced relation to the integral inflatable balloon, said inflatable balloon unit including a flexible central tubular portion slidable on the catheter body portion, an inflatable balloon having its ends integral with the central tubular portion and an inflation tube communicating with the interior of the inflatable balloon, whereby inflating the unit inflatable balloon provides a holding pressure on the central tubular portion.

5. A female incontinence catheter, comprising a tubular body portion having a longitudinal drainage passage, the wall of the catheter at the distal end having a drainage eye communicating with the drainage passage, an inflatable balloon integral with the body portion adjacent the distal end, and an inflatable balloon unit slidably mounted on the body portion in spaced relation to the integral inflatable balloon, the body portion having an inflation passage in its wall communicating with the integral interior of the inflatable balloon, said inflatable balloon unit including a flexible central tubular portion slidable on the catheter body portion, an inflatable balloon having its ends integral with the central tubular portion and an inflation tube communicating with the interior of the inflatable balloon, whereby inflating the unit inflatable balloon provides a holding pressure on the central tubular portion.

References Cited in the file of this patent

UNITED STATES PATENTS

| Number | Name | Date |
|---|---|---|
| 565,386 | Meengs | Aug. 4, 1896 |
| 1,245,325 | Dunn | Nov. 6, 1917 |
| 1,567,500 | Hein | Dec. 29, 1925 |
| 1,598,284 | Kinney | Aug. 31, 1926 |
| 2,455,859 | Foley | Dec. 7, 1948 |
| 2,473,742 | Auzin | June 21, 1949 |

FOREIGN PATENTS

| Number | Country | Date |
|---|---|---|
| 664,312 | Great Britain | Jan. 2, 1952 |